(12) United States Patent
Quinn, Jr. et al.

(10) Patent No.: US 7,523,444 B2
(45) Date of Patent: Apr. 21, 2009

(54) MANAGED AUTOMATION PROGRAMMING MODEL

(75) Inventors: Thomas E. Quinn, Jr., Seattle, WA (US); Nirav Y. Shah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 11/167,728

(22) Filed: Jun. 27, 2005

(65) Prior Publication Data

US 2006/0294494 A1 Dec. 28, 2006

(51) Int. Cl.
*G06F 9/44* (2006.01)
*G06F 15/16* (2006.01)
(52) U.S. Cl. .................... 717/120; 717/170; 709/230
(58) Field of Classification Search ................ 717/104, 717/120, 162, 165–168, 170; 709/203, 230, 709/236–237
See application file for complete search history.

(56) References Cited

U.S. PATENT DOCUMENTS

2004/0064503 A1* 4/2004 Karakashian et al. ....... 709/203

* cited by examiner

*Primary Examiner*—Lewis A Bullock, Jr.
*Assistant Examiner*—Jason Mitchell
(74) *Attorney, Agent, or Firm*—Woodcock Washburn LLP

(57) ABSTRACT

A managed automation programming model is provided for versioning computing components independently, isolating such components, and dynamically binding them. For example, components such as an application and an and-in are able to version independently of one another, so that disparate versions of these components are still able to communicate—or in the nominal case, the same versions are able to communicate. Moreover, such components are isolated by the managed automation programming model so that they can be disintegrated and bound with other components in a seamless manner. Lastly, the independent versioning and component isolation advantageously allows for dynamic binding of the components at runtime.

13 Claims, 13 Drawing Sheets

MANAGED AUTOMATION PROGRAMMING MODEL

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2005, Microsoft Corp.

TECHNICAL FIELD

The present invention generally relates to the field computing. More specifically, the present invention relates to managed automation for binding components.

BACKGROUND

Components, such as an application and an add-in, which may correspond to programs such as a word-processing program and a spell-checker, respectively, are easily integrated in a static environment. The reason is that in such a scenario a developer knows, a priori, which components interact well together. For example, the developer may know a priori that a word processing program interacts well with a particular spell-checker. Such components, then, can be easily bound at build time.

However, the problem becomes more difficult when dynamic binding is desired. Put another way, dynamic binding of components at runtime presents more difficult problems because of issues such as versioning of components and their mutual isolation. With respect to versioning, different versions of components often time leads to their incompatibility. For example, version 1.0 of an application may interact correctly with version 1.0 of an add-in. However, if the versioning is off, for example, if the application was upgraded to version 2.0 but the add-in remained at version 1.0, the two components may not work well together—or may not work at all.

The second problem leads to issues with the isolation of the components. For example, if the aforementioned application is integrated with the add-in, upgrading either component may prove difficult or impossible. Thus, if a computer user wants to upgrade an application to version 2.0 but is content with version 1.0 of the add-in, such a user may have a difficult time separating the two applications without breaking apart the integrated system.

To solve at least these two exemplary problems, that is, versioning and isolation, a dynamic binding system would be desirable whereby different versions of components can be used with each other, and where such components could be isolated from each other to such an extent that they don't affect one another when they are disintegrated. Moreover, it would be desirable to provide a managed automation programming model which could allow for dynamic binding of components at runtime, thus allowing these components to communicate in a managed code platform.

SUMMARY OF THE INVENTION

A managed automation programming model is provided that allows components in a computing system to version independently, isolate from one another, and dynamically bind to one another. Components, such as an application and an add-in, are able to communicate with one another via a protocol in spite of not being version commensurate. Put another way, the add-in could be either a higher or a lower version of the application and still function with the application—and vice versa.

Furthermore, these components are also isolated by the managed automation programming model such that a given add-in can be seamlessly bound and unbound from an application without creating integration and disintegration problems. For example, an old version of an add-in can be removed from an application seamlessly because it is relatively isolated from the application—and yet it is able to communicate with the application. This kind of isolation may be provided by remoting boundaries.

Lastly, both the independent versioning and the isolation of the components allow for dynamic binding of one component to another component. Different versions of components may be bound to each other at any time (beyond build time) because of versioning capabilities and the provided isolation of the components that allows for seamless switching of components.

Additional features of the invention will be made apparent from the following detailed description of illustrative aspects that proceed with reference to the accompanying drawings.

BRIEF DESCRIPTION OF THE DRAWINGS

The foregoing summary, as well as the following detailed description of the invention, is better understood when read in conjunction with the appended drawings. In order to illustrate the invention, various aspects of the invention are shown. However, the invention is not limited to the specific systems and methods disclosed. The following figures are included.

DETAILED DESCRIPTION OF ILLUSTRATIVE ASPECTS

Overview

At least three general aspects of the Managed Automation Programming Model (MAPM) are considered: (1) versioning, (2) isolation, and (3) dynamic binding. The below description explains how versioning of different components may be sustained while at the same time providing a framework where components can be isolated from each other. This versioning and isolation properties lead to the dynamic binding aspect of the invention. Components that can be bound to one another notwithstanding divergent component versions and components that can be isolated from one another so that they can be unbound and bound to other components, lends natural support for dynamic (as opposed to static) binding of components.

Lastly, a .NET framework with a MAPM sitting on top of it is illustrated, followed by a schematic diagram of an exemplary networked or distributed computing environment. Also, a brief general description of a suitable computing environment is provided in connection with which the invention may be implemented.

Aspects of the Managed Automation Programming Model (MAPM)

Figure 1:
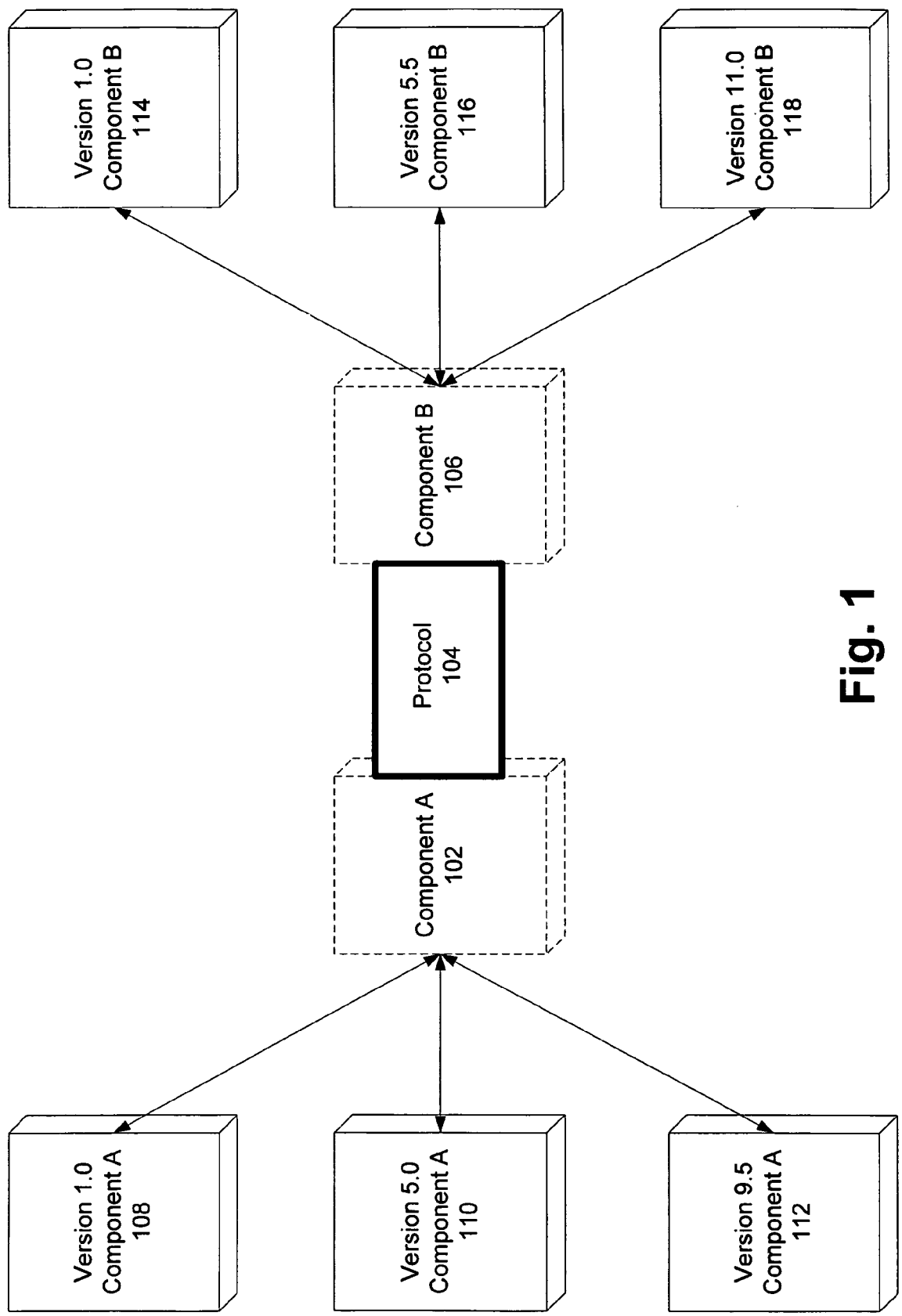
FIG. 1 illustrates a protocol in the Managed Automation Programming Model (MAPM) and how is it used for communication between two or more independently versioning components.

In one aspect of the invention, in FIG. 1, a "protocol" in the MAPM (or equivalently, managed automation framework) is used for communication between two or more independently versioning components. That is, while the components themselves may version, the protocol should not change. The protocol may be viewed as a specification or contract through which components communicate. This stable contract is a basis upon which the separately versioning components may continue to rely.

FIG. 1 illustrates one aspect of independent versioning of the components. Two components are given: component A 102 and component B 106. These components communicate through a protocol 104. The two components 102 and 106 are illustrated in dashed lines to indicate that any of the other illustrated components, namely, components 108, 110, and 112 could take the place of component A 102, and components 114, 116, and 118 could take the place of component B 106. Thus, components A 102 and B 106 are just any generic components.

Having a protocol 104 that remains constant and does not necessarily change allows for different versions of the components to interact with one another—as long as these components recognize the protocol in question. Thus, for example, in a nominal case, version 1.0 of component A 108 can communicate through the protocol 104 with version 1.0 of component B 114. However, more importantly, different version numbers can also communicate. Thus, version 1.0 of component A 108 can also communicate with version 5.5 of component B 116 and version 11.0 of component B 118. Likewise, version 5.0 of component A 110 can communicate either with versions of other components that are either higher or lower than version 5.0 of component A 110: version 5.0 of component A 110 can communicate with version 1.0 of component B 114 or version 11.0 of component B 118.

The gist of this aspect of the invention is that any two components can version independently from one another. This allows for better compatibility among components and ease of use when using such components in a computing framework such as .NET.

Figure 2:
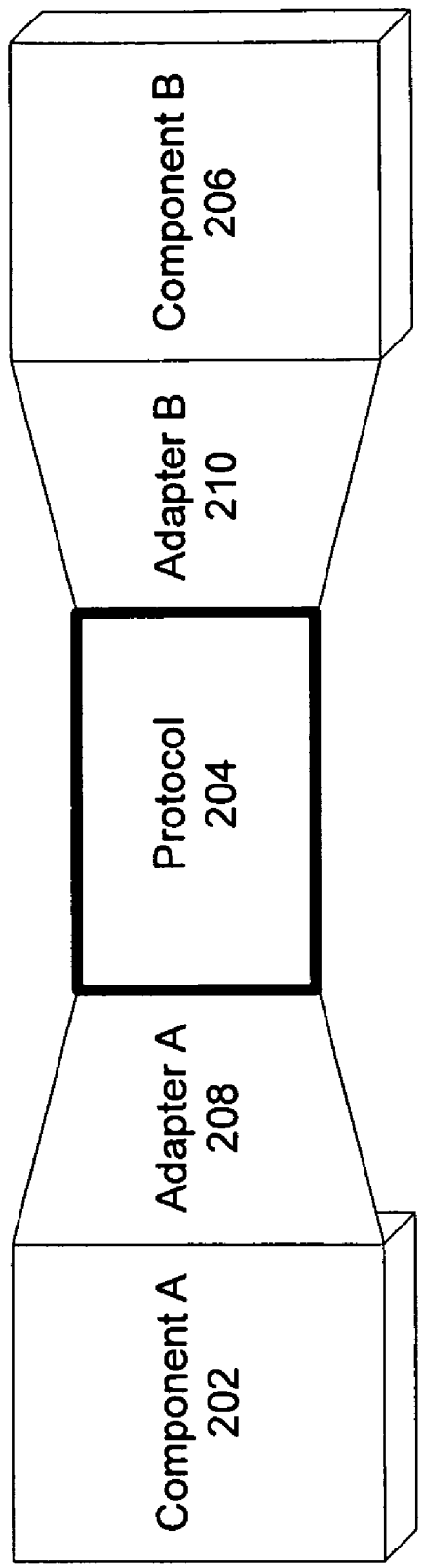
FIG. 2 illustrates adapters, where the adapters are intermediate to their respective components and the protocol.

In another aspect of the invention, in FIG. 2, adapters are shown, where the adapters are intermediate to their respective components and the protocol. Thus, adapter A 208 is shown, where the adapter is located between component A 202 and the protocol 204. Likewise, adapter B 210 is located between component B 206 and the protocol 204. Adapters, herein, are understood to be objects that adapt the API of one object to another object (or component). In the MAPM, adapters are managed types that either implement or call protocols. Put another way, they are the classes that obscure the protocols from concrete implementations.

Interestingly, there are a variety of adapters. For example, a "protocol" adapter is understood to be a class that implements a protocol. Protocol Adapters can take many forms: sealed classes used by other classes; abstract base classes used throughout an application; or polymorphic implementation classes that can optionally be extended. The MAPM provides many protocol adapters for reuse, including abstract base classes that can be used as the building blocks for any protocol adapter.

Another example of an adapter is a "view" adapter. A "view" is simply defined as a class that calls a protocol. A view is essentially a proxy for the implementation hidden behind a protocol and a protocol adapter. It presents a friendly programming façade to a user. In so doing, it hides the restrictions and complexities of the protocol itself. Where a protocol can only expose other protocols and primitive types, a view can expose virtually any type, including non-serializable types and other views. Unlike protocol adapters, views as presented to a user or consumer are typically of a single form: sealed classes—though they will also typically derive from a polymorphic implementation class provided by the MAPM. Additionally, the MAPM also provides reusable view adapters, as similarly discussed above with reference to protocol adapters.

Figure 3:
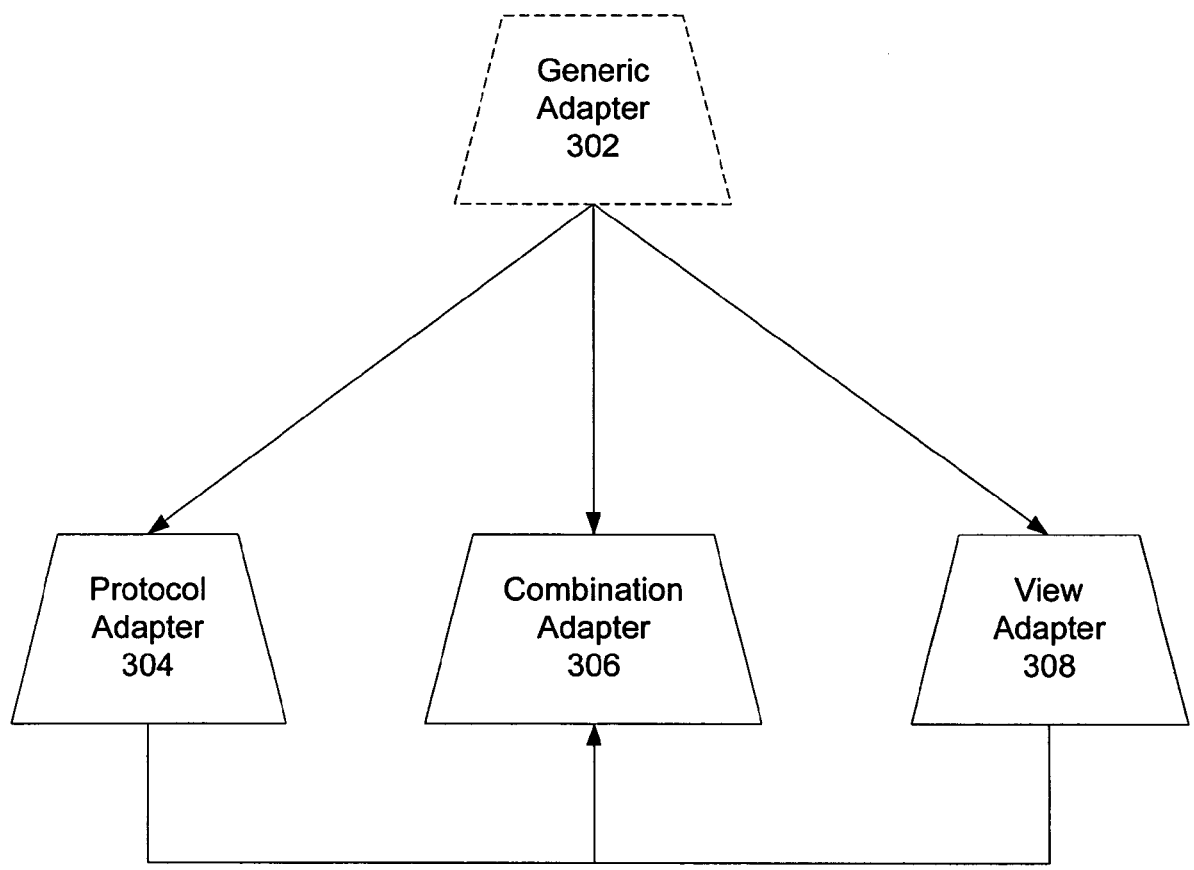
FIG. 3 illustrates some of the different types of adapters that may be used in one aspect of the invention.

Moreover, these two types of adapters, namely, protocol adapters and view adapters, can be combined. Thus, it is fairly common for a particular class to serve both as a view adapter and a protocol adapter. FIG. 3 illustrates some of the different types of adapters that may be used in one aspect of the invention. A generic adapter 302 is depicted in dashed lines, and this type of adapter can be instantiated in at least one of three forms: as a protocol adapter 304, a combination adapter 306, and a view adapter 308. As mentioned above, the protocol adapter 304 and the view adapter 308 can combine to make up the combination adapter 306.

Figure 4:
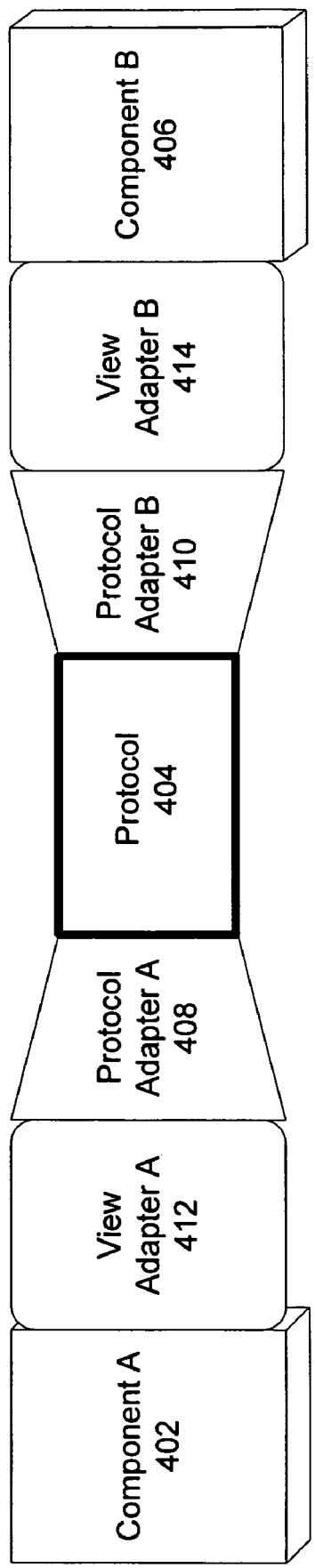
FIG. 4 illustrates yet another aspect of the invention where the components, view adapters, protocol adapters, and protocol all interact.

In combining FIGS. 2 and 3, FIG. 4 illustrates yet another aspect of the invention where the components, view adapters, protocol adapters, and protocol all interact. Per FIG. 4, component A 402 is coupled to a view adapter A 412, and the view adapter A 412, in turn, is coupled to the protocol adapter A 408. Based on the discussion above with regard to FIG. 3, protocol adapter A 408 implements the protocol 404 and the view adapter 412A calls the protocol 404. Similar logic holds true for protocol adapter B 410 and view adapter B 414. Thus, the entire view adapter A 412—protocol adapter A 408—protocol 404—protocol B 410—view adapter B 414 pipeline allows the two components, component A 402 and component B 406 to communicate in such a way that different versions of the two components can exist, and at the same time allows these two components to be isolated from one another.

A spreadsheet and database scenario illustrate a real world example of how the pipeline with components can be used. A third party may want to plug-in a piece of code that drives spreadsheet data from a database to an spreadsheet application. Once the data is pulled down from the database, the spreadsheet application performs some operations and manipulations and pushes the data back into the database. So, for instance, a spreadsheet program like Excel does not need to even know about the database, but rather it needs to know only about the driver. Thus, per FIG. 4, component A 402 could correspond to the Excel spreadsheet application and component B 406 could correspond to a database. The protocol adapters A 408 and B 410 would implement a protocol 404, and the view adapters A 412 and B 414 would call the protocol so that data in component B 406 could be pulled into component A 402, and once component A 402 operated on the data, it could push the data back to component B 406.

Figure 5:
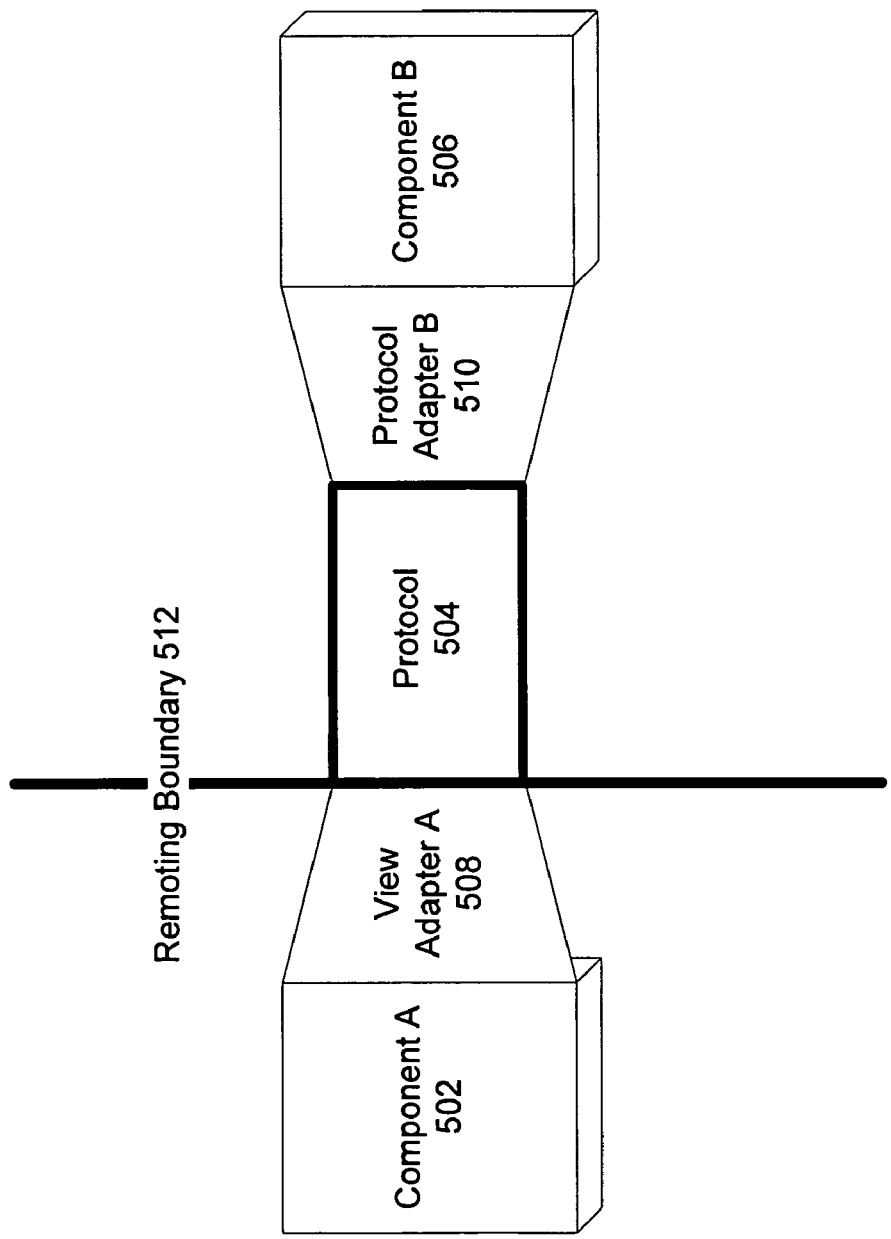
FIG. 5 illustrates the isolation of two typical components that communicate via a protocol.

In another aspect of the invention, FIG. 5 illustrates the isolation of two typical components that communicate via a protocol. Such components can communicate across a remoting boundary. One example of a remoting boundary in a .NET framework is an AppDomain. The AppDomain provides a boundary in the form of a miniprocess within a process so that code within the AppDomain can be isolated from other code. However, remoting boundaries can be manifested in other ways in software or hardware, such as boundaries between different processors, different processes, and even different machines.

For example, a spell-checker can be contained within one AppDomain, and a word-processing application can be contained in another AppDomain. This isolation allows not only the spell-checker and the word-processing application to maintain their respective integrities, but also allows for easy separation of the two components. Otherwise, if both the word-processing application and the spell-checker were contained in the same AppDomain, separation of the two would be a lot more difficult. Such a separation might be required, for example, if different versions of the two components are available and desired.

Turning now to FIG. 5, a remoting boundary 512 is shown. As mentioned, a boundary in the form of an AppDomain can be constructed, where the AppDomain is an isolated miniprocess within a given process. This boundary can prevent the remoting or sending of code from one component to another component The components, component A 502 and component B 506 can be any of the components discussed so far, whether applications or add-ins or anything equivalent of that sort. FIG. 5, illustrates an implementation where component A 502 uses a view adapter A 508 to call the protocol 504 which is implemented by protocol B 510, thus allowing component A 502 to communicate with component B 506. The remoting boundary 512 makes sure that no unwanted communication takes place between components A 502 and B 506 and that these components can be interchanged without affect other components.

In another aspect of the invention, FIG. 6 illustrates the Managed Automation Programming Model (MAPM) and how it allows for dynamic binding of components which leads to the two aspects discussed above: versioning (e.g. see FIG. 1) and isolation (e.g. see FIG. 5). The MAPM is a managed model in that it can be based on the .NET framework, where the .NET framework helps to manage various aspects of program execution, like allocation of memory for the storage of data and instructions, granting and denying permissions to applications, managing execution of these applications, reallocation of memory for resources that are not needed, and so on.

A MAPM framework 604 is illustrated, where the MAPM 604 has predefined adapters 606 and 608 and predefined protocols 602. The MAPM 604 provides the ability to create independently versioning entities, such as application 610 and add-in 612. These entities can also be isolated so that they can be unloaded and have different security contexts. Importantly, the add-in 612 can be late bound at runtime (as opposed to compile time) to the application 610 across any remoting boundaries.

Figure 6A:
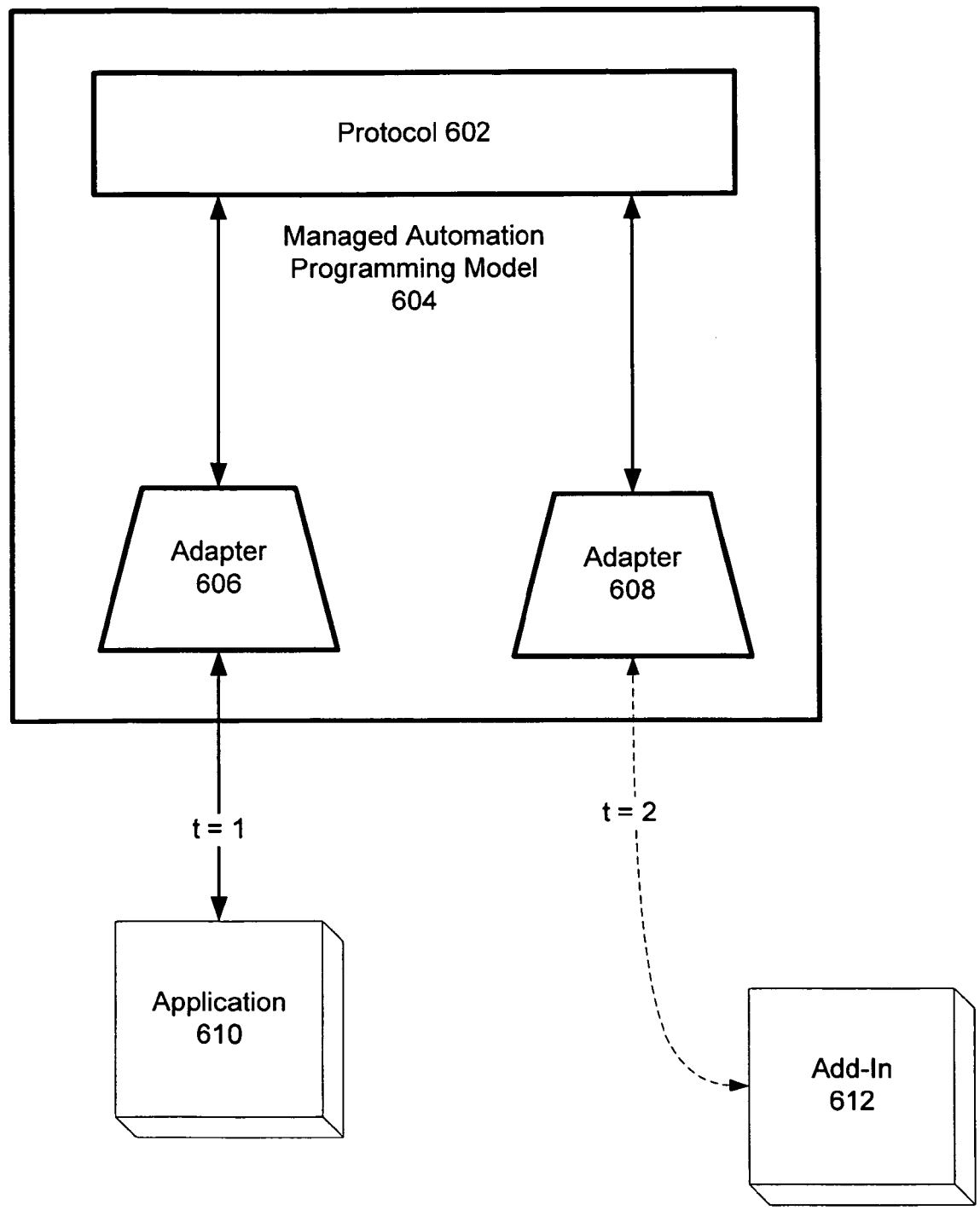
FIG. 6A illustrates the MAPM and how it allows for dynamic binding of components.

Thus, FIG. 6A illustrates that a first component, the application 610, is bound at a time t=1 via the MAPM 604 to some add-in (not shown). Some time later, perhaps during runtime, at time t=2, a second component, another add-in 612, is added to the MAPM 604. The add-in 612 is depicted as being added via a dashed line to communicate the notion it is added dynamically. In contrast, the application 610 may be bound at build time (to some previous add-in) and so it is connected to the MAPM 604 via a solid line. It should be noted that the add-in 612 does not have to be bound at t=2, in fact it could be statically bound to the application 610 at t=1.

Figure 6B:
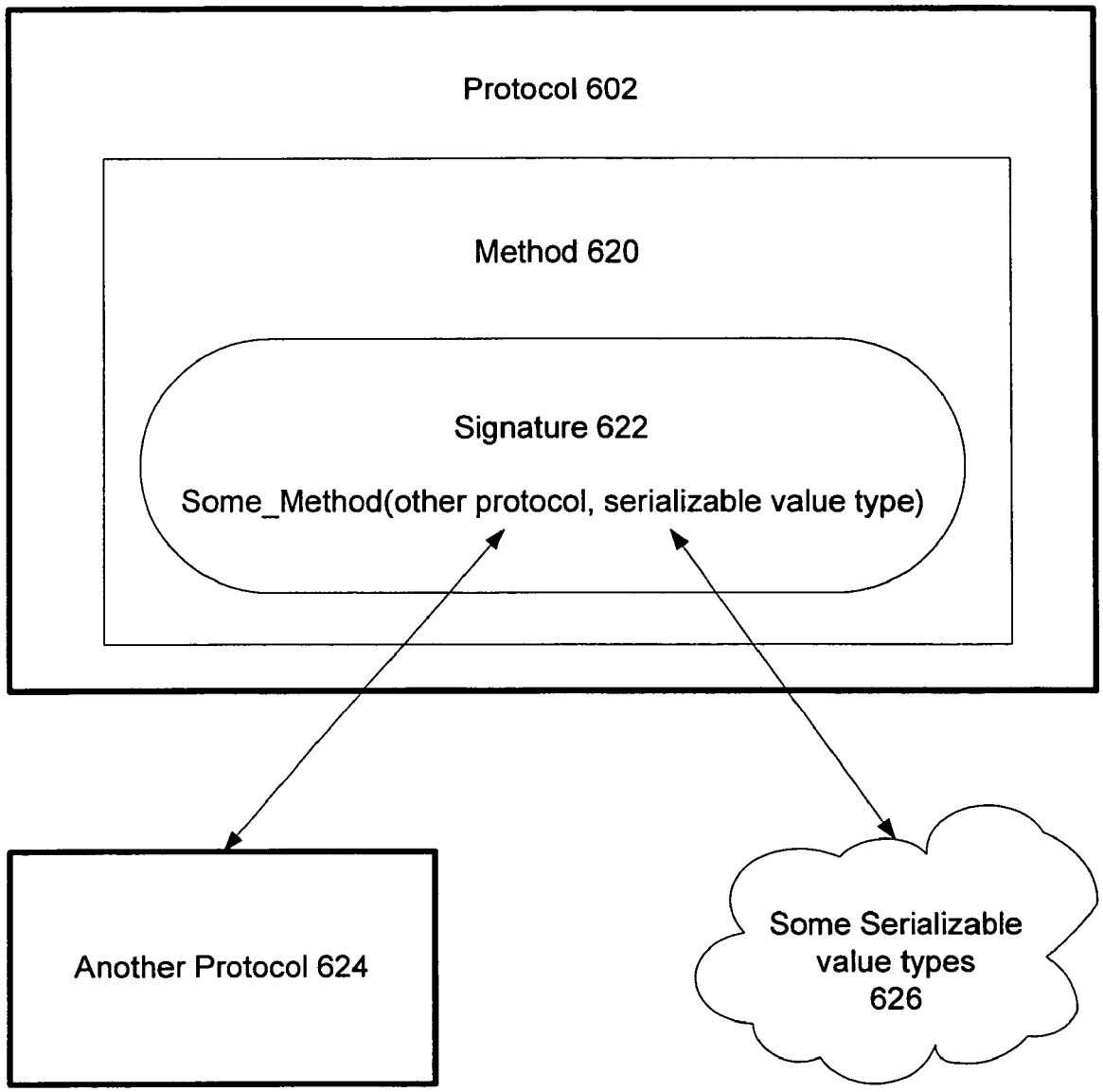
FIG. 6B illustrates a detailed examination of the MAPM's protocol architecture.

In accomplishing the at least three goals discussed above with reference to FIG. 1-6, namely, versioning, isolation, and late bounding, various technical issues arise. For example, to maintain version resilience, the signatures of the methods of protocols may only expose other protocols or serializable value types, defined with the protocols, or primitive types in such frameworks as .NET. Thus, FIG. 6B illustrates a protocol 602, where the protocol has some method 620. Such a method has a signature 622 where the signature 622 of the method 620 is the combination of the method's 620 name along with the number and types of the parameters (and their order). In the illustrated example, two arguments are show, namely, "other protocol" and "serializable value type". The "other protocol" corresponds to some other protocol 624 that the signature of the method of the protocol may expose. The "serializable value type" is just any typical serializable type. For example, it could be a simple aggregate type one might construct a ferry a chunk of data, something like:

```
[Serializable]
Struct CustomerData
{
    String Name;
    String Address;
}
```

The serializable attribute is required to make this marshal by value, meaning the data is copied across a remoting boundary into a new instance.

Moreover, in following the type leakage rule, protocols may not expose events or delegates in their signatures. The reason is that events and delegates are essentially types which represent function pointers. The function pointers are encapsulated in the delegate class, but the function that is invoked is always written in a subclass.

As another example, if the above discussed components are to be indeed isolated from each other, their types should be literally mutually invisible. Only the agreed upon protocols should be visible to both components. In other words, each component's types should be kept to itself and not shared with other components and only protocols should be seen by either component. This is a type leakage rule that one aspect of the invention implements.

Figure 6C:
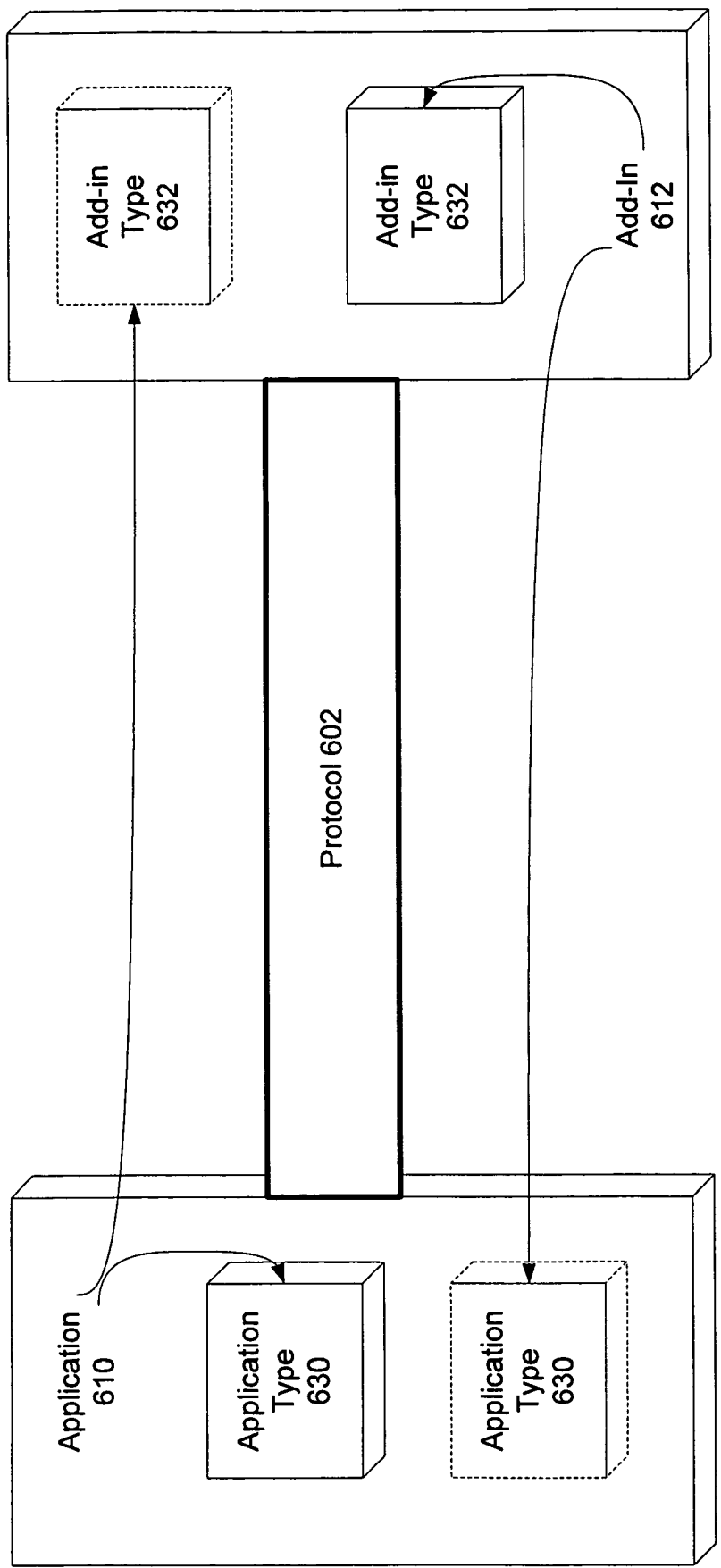
FIG. 6C illustrates the visibility and invisibility of types by components.

Thus, FIG. 6C illustrates the two components discussed in reference to FIG. 6A, namely, the application 610 and the add-in 612. The application has some application type 630, and this application type 630 is visible to the application 610, as expected. Likewise, the add-in 612 has some add-in type 632 that is visible to the add-in 612. However, the add-in type 632 is not visible to the application 610—this is shown by illustrating the add-in type 632 in a dashed line. Likewise, the application type 630 is not visible to the add-in 612. However, the protocol 602 is visible to both of these components.

Still in other aspects of the invention, conventions for protocols are defined. These conventions are .NET interfaces (see below for a comprehensive discussion of the .NET framework) and not necessarily abstract classes. The reason for choosing interfaces is to eliminate the possibility of behavior being associated with the protocol, as well as to ensure that the protocols will work regardless of remoting transport. This also eliminates the possibility of constructors being called with protocols across the remoting boundary. Calling constructors across the boundary may result in type leakage (as discussed above), because constructor parameters must be passed in an object array through one of the various instance creating functions.

Moreover, any such .NET interface derives from a common base inferace. An example of a common base interface is the following root protocol, System.Protocol.IProtocol:

```
namespace System.Protocol
{
    public interface IProtocol
    {
        IProtocol QueryProtocol(string protocolType);
        int GetRemoteHashCode( );
        String RemoteToString( );
        int AcquireLifetimeToken( );
            void RevokeLifetimeToken(int token);
    }
}
```

As can be clearly seen from above, IProtocol derives from IDisposable. This allows and requires that all protocol implementations implement the Disposable pattern, which in turn allows a degree of deterministic finalization of resources used by protocol implementations. The first method, above, QueryProtocol, allows consumers to ask an implementation if it supports other protocols. Or, alternatively, if it allows for the obtaining of a more specific protocol from a less specific one (like IProtocol itself). Notably, the only way to get from one protocol to another protocol on the same identity is via the QueryProtocol method.

QueryProtocol takes a string. The string parameter can contain the fully qualified type name of the protocol being queried for. Thus a call to QueryProtocol may look like this:

IMyProtocol myProtocol=(IMyProtocol)protocol.QueryProtocol(typeof(IMyProtocol).FullName);

A string is used here rather than a "Type" type directly. This is because of security issues.

Moreover, to facilitate the implementation of IProtocol.QueryProtocol, the MAPM defines a new exception: ProtocolNotFoundException, which is thrown whenever a queried for protocol is not supported (the .NET equivalent is E_NOINTERFACE). Exceptions may be the one exception to the guideline that protocol assemblies contain no classes or implementation. In some instances—and this is one—it may be necessary to define new exceptions to be used in the implementation of certain protocols.

The other method on IProtocol is GetRemoteHashCode. This method exists to provide an identity for the protocol. GetRemoteHashCode returns an unique value for each instance of an object that implements a given protocol. This value can be used to determine identity by the protocol consumer.

Due to constraints of type-leakage (discussed above), reflection is not allowed across the protocol (or remoting) boundaries. Refelction, in general, is understood to be the mechanism of discovering class information solely at run time. Thus, in this aspect of the invention, a group of protocols are provided that emulate the functionality of reflection and support an implementation that allows the ability to late bind to concrete functionality across the protocol boundary. Reflection means that these protocols don't expose certain system or reflection types, but what they do expose is an ability to implement a subset of the reflection functionality, in a transparent way, which allows clients to discover and invoke methods and properties at runtime rather than design (or build) time. Some examples of reflection protocols are defined as follows (note that some of these protocols rely upon Collection protocols discussed later in this document):

```
namespace System.Protocol
{
    //this is the main object being remoted
    //its purpose is to, mainly, expose the IRemoteTypeProtocol
    public interface IRemoteObjectProtocol:Protocol
    {
        IRemoteTypeProtocol GetRemoteType( );
        string RemoteToString( );
    }
    public interface IRemoteMemberInfoProtocol:IProtocol
    {
        IRemoteTypeProtocol DeclaringType { get; }
        string Name { get; }
    }
    public interface IRemoteTypeProtocol:IRemoteMemberInfoProtocol
    {
        IArrayListProtocol<IRemoteMemberInfoProtocol> FindMembers(
    uint memberTypeEnum, uint bindingAttr);
            IArrayListProtocol<IRemoteMemberInfoProtocol> GetDefaultMembers( );
            IRemoteEventInfoProtocol GetEvent(string name, uint bindingAttr);
            IArrayListProtocol<IRemoteEventInfoProtocol> GetEvents(
    uint bindingAttr);
        IRemoteFieldInfoProtocol GetField(string name, uint bindingAttr);
        IArrayListProtocol<IRemoteFieldInfoProtocol> GetFields(
```

-continued

```
uint bindingAttr);
            IArrayListProtocol<IRemoteMemberInfoProtocol> GetMember(
string name, uint memberTypes, uint bindingAttr);
            IArrayListProtocol<IRemoteMemberInfoProtocol> GetMembers(
uint bindingAttr);
            IRemoteMethodInfoProtocol GetMethod(string name,
uint bindingAttr, uint callConvention,
IArrayListProtocol<IRemoteTypeProtocol> remoteTypes);
            IArrayListProtocol<IRemoteMethodInfoProtocol> GetMethods(
uint bindingAttr);
            IRemotePropertyInfoProtocol GetProperty(string name, uint bindingAttr,
IRemoteTypeProtocol remoteReturnType,
IArrayListProtocol<IRemoteTypeProtocol> remoteTypes);
            IArrayListProtocol<IRemotePropertyInfoProtocol> GetProperties(
uint bindingAttr);
            SafeRemoteParam InvokeMember(string name, uint invokeAttr,
IRemoteObjectProtocol target, SafeRemoteParam[] remoteArgs,
CultureInfo culture, string[] namedParameters);
            bool HasElementType { get; }
            IRemoteTypeProtocol GetElementType( );
            bool IsByRef { get; }
            bool IsPrimitive { get; }
            bool IsValueType { get; }
            bool IsArray { get; }
            string AssemblyQualifiedName { get; }
            string FullName {get;}
            string CanonicalName { get; }
    }
    public interface IRemoteCollectionTypeProtocol:IProtocol
    {
        int GetArrayRank( );
    }
    public interface IRemoteCOMObjectTypeProtocol:IProtocol
    {
        Guid GetGUID( );
    }
    public interface IRemoteEventInfoProtocol:IRemoteMemberInfoProtocol
    {
        uint Attributes { get; }
        IRemoteTypeProtocol EventHandlerType { get; }
        void AddEventHandler(IRemoteObjectProtocol target,
IRemoteEventHandlerProtocol handler);
        void RemoveEventHandler(IRemoteObjectProtocol target,
IRemoteEventHandlerProtocol handler);
    }
    public interface IRemoteEventHandlerProtocol:IProtocol
    {
        void HandleEvent(IRemoteObjectProtocol sender,
IRemoteEventArgsProtocol e);
    }
    [CLSCompliant(false)]
    public interface IRemoteEventArgsProtocol:IProtocol
    {
        IRemoteEventInfoProtocol EventInfo { get; }
        SafeRemoteParam[] EventParams { get; }
    }
    [CLSCompliant(false)]
    public interface IRemoteFieldInfoProtocol:IRemoteMemberInfoProtocol
    {
        SafeRemoteParam GetValue(IRemoteObjectProtocol obj);
        void SetValue(IRemoteObjectProtocol obj, SafeRemoteParam value);
        uint Attributes { get; }
        IRemoteTypeProtocol FieldType { get; }
    }
    [CLSCompliant(false)]
    public interface IRemoteMethodInfoProtocol:IRemoteMemberInfoProtocol
    {
        uint GetMethodImplementationFlags( );
        IArrayListProtocol<IRemoteParameterInfoProtocol> GetParameters( );
        SafeRemoteParam Invoke(IRemoteObjectProtocol target, uint invokeAttr,
SafeRemoteParam[] parameters, CultureInfo culture);
        uint Attributes { get; }
        IRemoteParameterInfoProtocol ReturnParameter { get; }
        IRemoteTypeProtocol ReturnType { get; }
    }
    [CLSCompliant(false)]
    public interface IRemotePropertyInfoProtocol:IRemoteMemberInfoProtocol
    {
        IArrayListProtocol<IRemoteMethodInfoProtocol> GetAccessors( );
```

-continued

```
            IRemoteMethodInfoProtocol GetGetMethod( );
            IRemoteMethodInfoProtocol GetSetMethod( );
            IArrayListProtocol<IRemoteParameterInfoProtocol> GetIndexParameters( );
            SafeRemoteParam GetValue(IRemoteObjectProtocol obj, uint invokeAttr,
SafeRemoteParam[] index, CultureInfo culture);
            void SetValue(IRemoteObjectProtocol target, SafeRemoteParam value,
uint invokeAttr, SafeRemoteParam[] index, CultureInfo culture);
            uint Attributes { get; }
            bool CanRead { get; }
            bool CanWrite { get; }
            IRemoteTypeProtocol PropertyType { get; }
        }
        [CLSCompliant(false)]
        public interface IRemoteParameterInfoProtocol:IProtocol
        {
            void GetInfo(out uint attributes,
out IRemoteTypeProtocol remoteParamType,
out SafeRemoteParam defaultValue, out string name,
out int position, out bool paramIsByRef);
        }
}
```

Figure 7A:
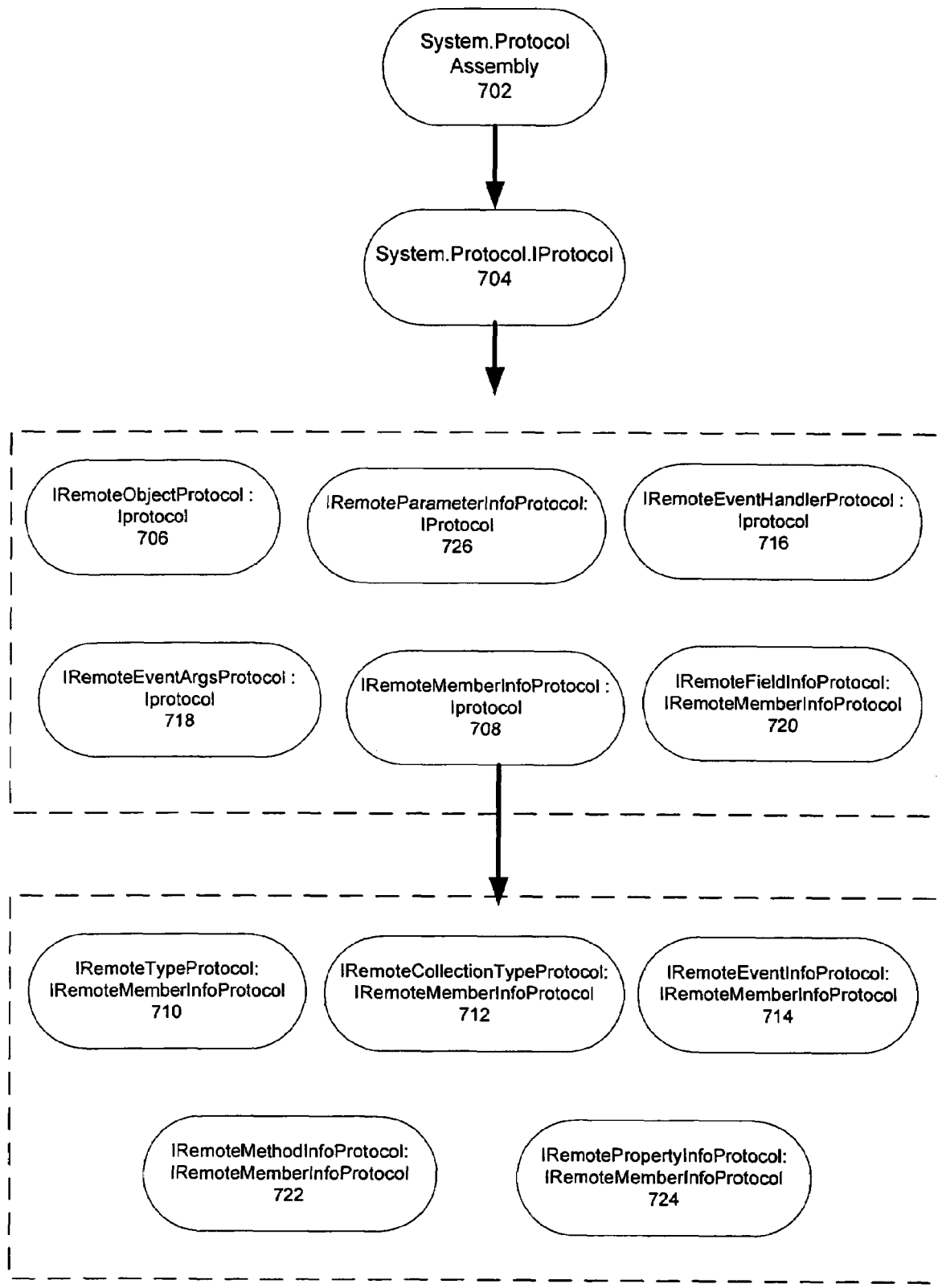
FIG. 7A illustrates the hierarchical relationship between protocols in one aspect of the invention.

Examining the above code, it becomes apparent that a system.protocol assembly is at the root of many of the subsequent protocols. For example, FIG. 7A illustrates the hierarchical relationship between protocols in one aspect of the invention. The system.protocol assembly 702 serves as the basis for IProtocol 704. Or, put another way, IProtocol 704 derives from the assembly 702. IProtocol 704, in turn serves as the basis for several derived methods: 706, 708, 716, 718, 726, 720. Each of these protocols is explained in detail directly above. Notably, the IRemoteMemberInfoProtocol 708 serves as the basis for a collection of other protocols: 710, 712, 714, 722, and 724. This is but an exemplary relationship of protocols, meant to be illustrative not limiting.

The protocols illustrated in FIG. 7A provide the ability to safely invoke, via late binding, public methods, etc. across the remoting boundary without violating the rules of type-leakage. True reflection is very powerful and requires that the caller be fully trusted—the reflection protocols necessarily restrict this power to only safe operations and require no specific permission from the caller.

Figure 7B:
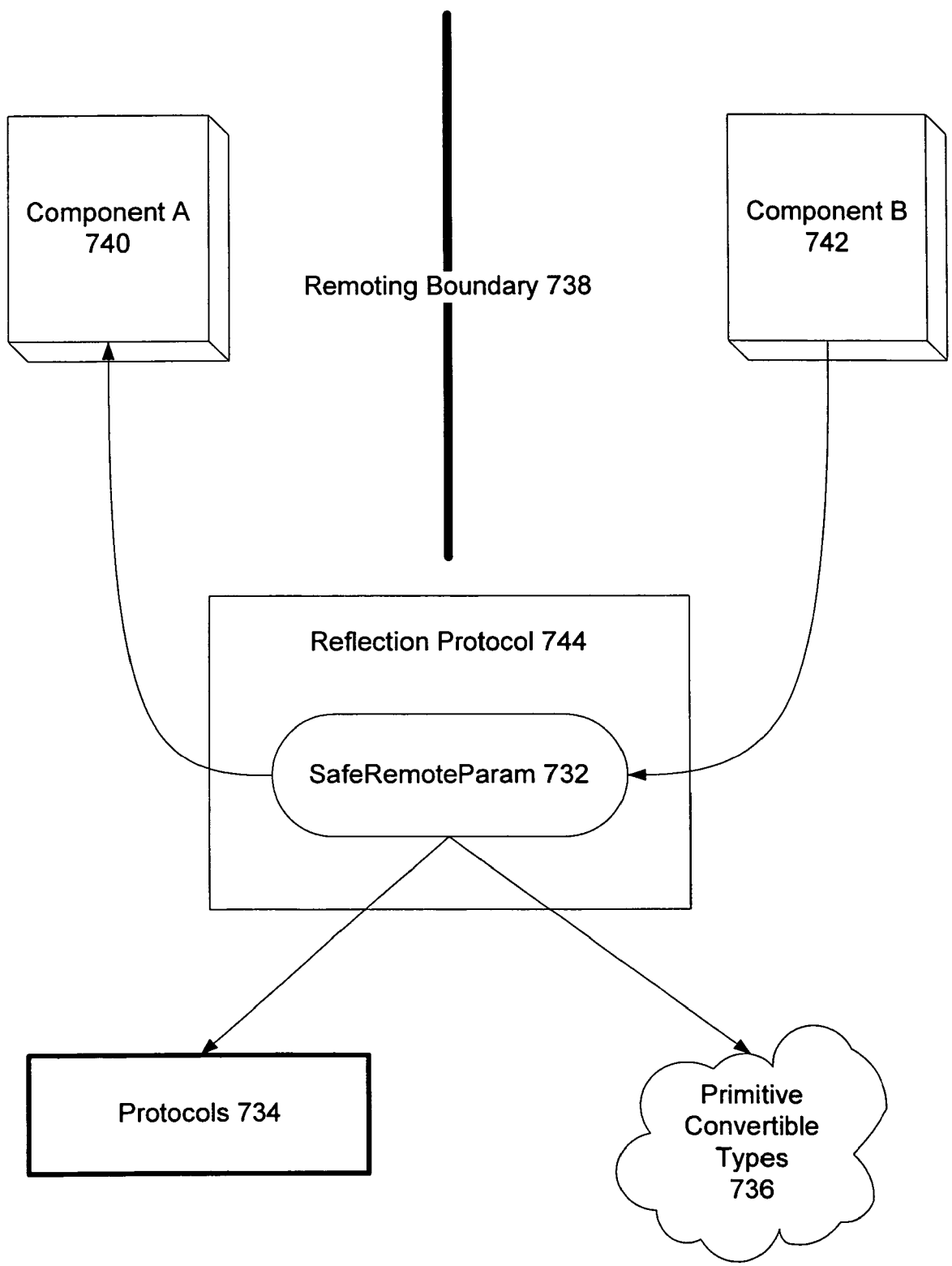
FIG. 7B illustrates how the MAPM manages reflection.

In reference to FIG. 7B, it is important to note that the type SafeRemoteParam 732 is present in many of the signatures of the reflection protocols 744 listed above. In the creation of the reflection protocols 744 a way is needed to pass arguments of unknown types across the remoting boundary 738. What is needed is a new type that can be used to represent any "protocol safe" type. SafeRemoteParam 732 fulfills this need.

The manner in which SafeRemoteParam 732 accomplishes this task is by implementing itself as an abstract base class, as is illustrated in FIG. 7B. The MAPM contains two concrete implementions of SafeRemoteParam 732, one used to contain protocols 734, the other used to contain primitive convertible types 736. So SafeRemoteParam 732 restricts the types used in reflected late-bound calls further than the general protocol rules. It can contain only protocols 734 or the standard convertible types 736. Thus, for example, all the numeric types, plus string, bool, DateTime, DBNull, and Empty are valid.

Notably, SafeRemoteParam 732 is a bit of an anomaly because it is a class that is included with protocols. To adhere to the protocol rules, SafeRemoteParam 732 must be fully-serializable machine-wide marshall-by-value type, where marshalling entails the notion of converting a data object between types when sending it across contexts, as for example, between two components. SafeRemoteParam 732 meets these criteria by being included with the base protocols, which can also be in a machine-wide platform assembly, by not deriving from other objects and by being serializable. In general, including classes in protocol assemblies is extremely rare.

SafeRemoteParam itself implements IConvertible (see above) to allow the exposure of its underlying type directly and to allow the coercion of the underlying type to another convertible type. In addition it supports explicit conversion overloads for these types.

SafeRemoteParam, as noted, is itself abstract and contains no constructor. Its derived implementations are specifically private as well—they are exposed only as the base type. So to create an instance of SafeRemoteParam the developer must call one of the static creation methods. The public surface of SafeRemoteParam is as follows:

```
[Serializable]
        public abstract class SafeRemoteParam:IConvertible
        {
            [CLSCompliant(false)]
            public static SafeRemoteParam CreateSafeRemoteParam(
    IConvertible value, bool byRef);
            [CLSCompliant(false)]
            public static SafeRemoteParam CreateSafeRemoteParam(
    IConvertible value);
            public static SafeRemoteParam CreateSafeRemoteParam(
    IProtocol value, bool byRef);
            public static SafeRemoteParam CreateSafeRemoteParam(IProtocol value);
            public static SafeRemoteParam CreateDefaultSafeRemoteParam(
```

```
bool byRef);
        public static SafeRemoteParam CreateSafeRemoteOutParam(
TypeCode typeCode);
        public static explicit operator bool(SafeRemoteParam param);
        public static explicit operator DateTime(SafeRemoteParam param);
        public static explicit operator string(SafeRemoteParam param);
        public static explicit operator int(SafeRemoteParam param);
        public static explicit operator long(SafeRemoteParam param);
        public static explicit operator short(SafeRemoteParam param);
        [CLSCompliant(false)]
        public static explicit operator uint(SafeRemoteParam param);
        [CLSCompliant(false)]
        public static explicit operator ulong(SafeRemoteParam param);
        [CLSCompliant(false)]
        public static explicit operator ushort(SafeRemoteParam param);
        public static explicit operator byte(SafeRemoteParam param);
        [CLSCompliant(false)]
        public static explicit operator sbyte(SafeRemoteParam param);
        public static explicit operator char(SafeRemoteParam param);
        public static explicit operator float(SafeRemoteParam param);
        public static explicit operator double(SafeRemoteParam param);
        public static explicit operator decimal(SafeRemoteParam param);
        //Instance Members:
        public virtual Type GetParamType();
        public abstract object Param Value { get; set; }
        public abstract TypeCode GetParamTypeCode( );
        public bool PassByRef { get; }
        public bool PassOutOnly { get; }
        public override string ToString( );
        //IConvertible explicit implementation
        TypeCode IConvertible.GetTypeCode( );
        bool IConvertible.ToBoolean(IFormatProvider fmtProvider);
        byte IConvertible.ToByte(IFormatProvider fmtProvider);
        char IConvertible.ToChar(IFormatProvider fmtProvider);
        DateTime IConvertible.ToDateTime(IFormatProvider fmtProvider);
        decimal IConvertible.ToDecimal(IFormatProvider fmtProvider);
        double IConvertible.ToDouble(IFormatProvider fmtProvider);
        short IConvertible.ToInt16(IFormatProvider fmtProvider);
        int IConvertible.ToInt32(IFormatProvider fmtProvider);
        long IConvertible.ToInt64(IFormatProvider fmtProvider);
        sbyte IConvertible.ToSByte(IFormatProvider fmtProvider);
        float IConvertible.ToSingle(IFormatProvider fmtProvider);
        string IConvertible.ToString(IFormatProvider fmtProvider);
        object IConvertible.ToType(Type conversionType,
IFormatProvider fmtProvider);
        ushort IConvertible.ToUInt16(IFormatProvider fmtProvider);
        uint IConvertible.ToUInt32(IFormatProvider fmtProvider);
        ulong IConvertible.ToUInt64(IFormatProvider fmtProvider);
    }
```

The methods worthy of note are, of course, the static creation methods. The first two are fairly self explanatory:

```
        [CLSCompliant(false)]
            public static SafeRemoteParam CreateSafeRemoteParam(
        IConvertible value, bool byRef);
            [CLSCompliant(false)]
                public static SafeRemoteParam CreateSafeRemoteParam(
        IConvertible value);
```

IConvertible restricts the passed in value to a type that implements IConverible, the implementation restricts this further to only those type whose GetTypeCode method returns something other the TypeCode.Object. In other words, these create methods are to be used only for primitive types whose types are explicitly named in the System.TypeCode enumeration. The bool byRef parameter has to do with how the SafeRemoteParam is intended to be passed—as opposed to marshalled; value types by definition are marshalled by value—to the method being invoked. If byRef is true, the value is marshalled twice: going in and coming out of the invoked method.

In addition to reflection protocols discussed above, in another aspect of the invention strongly typed and generic collection types are handled. The collection protocols, collectively, are used to represent references to collections across a protocol boundary. These are appropriate for use when the collection represents a collection of objects, objects represented by collected protocols, or when the collection is a view upon a shared data set that may be altered by other clients and must remain in sync.

Having discussed the protocol aspect of the MAPM, it should be noted that the MAPM provides adapters for its various protocols. The adapters by and large reside within an assembly. In most cases, both a protocol adapter and a view adapter are provided for a given protocol. In some cases, multiple adapters are provided.

In one aspect, a base class for all protocol adapters is provided. This is beneficial in making all protocol implementations marshalable across a given remote boundary. This base class can provide a default implementation, thus setting an implementation pattern for all protocol adapters, using explicit interface implementation. The default scenario separates cleanly the protocol from the class implementation. It also seals the interface implementation in the base class, meaning that sub-classes cannot override the implementation—virtual methods are explicitly provided when overrides may be required or desired.

Just as with the protocol adapters mentioned above, there are base classes for view adapters. For example, with respect to view adapters for reflection protocols, these base classes are extended within a framework, such as .NET, to provide the default reflection implementation. The MAPM can extend these classes too—similarly, the extensions are internal implementations exposed as the base class types. The MAPM extensions utilize the reflection protocols to reflect upon and invoke objects remotely. The main reason for these classes is to allow late binding to unknown objects at runtime. The object being invoked can change in version—it can be an entirely different object. The only requirement is that type being reflected upon maintain the same operations from version to version so that code written for earlier versions will continue to work. Moreover, reflection adapters can come in pure manage set form, where such adapters implement reflection protocols and use real reflection to invoke reflected managed types.

In another aspect, it is observed that when an object is marshaled across a remoting boundary, its lifetime is subject to a leasing term. In other words, an object's lifetime can be leased. When the lease expires, the object is available for garbage collection. By default, a lease can be five minutes. The lease can be renewed every time the object is accessed through the remoting boundary. If it is not accessed within five minutes, the lease expires and the object is collected. Since, generally speaking, this is not desired behavior, the MAPM could give an object an infinite lease thus preventing clients from getting exceptions when otherwise an object would have expired. However, the downside is that long-running applications may build up many objects that are never collected and cause memory exceptions instead.

The MAPM manages to solve this problem by sponsoring any given lease. A sponsor is an object that is given a chance by the system to renew a lease that is expiring. The sponsor is a separate object which resides in the same AppDomain with an object subject to a lease. This sponsor object maintains a count of times that the object is marshaled across a remoting boundary.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

Figure 8:
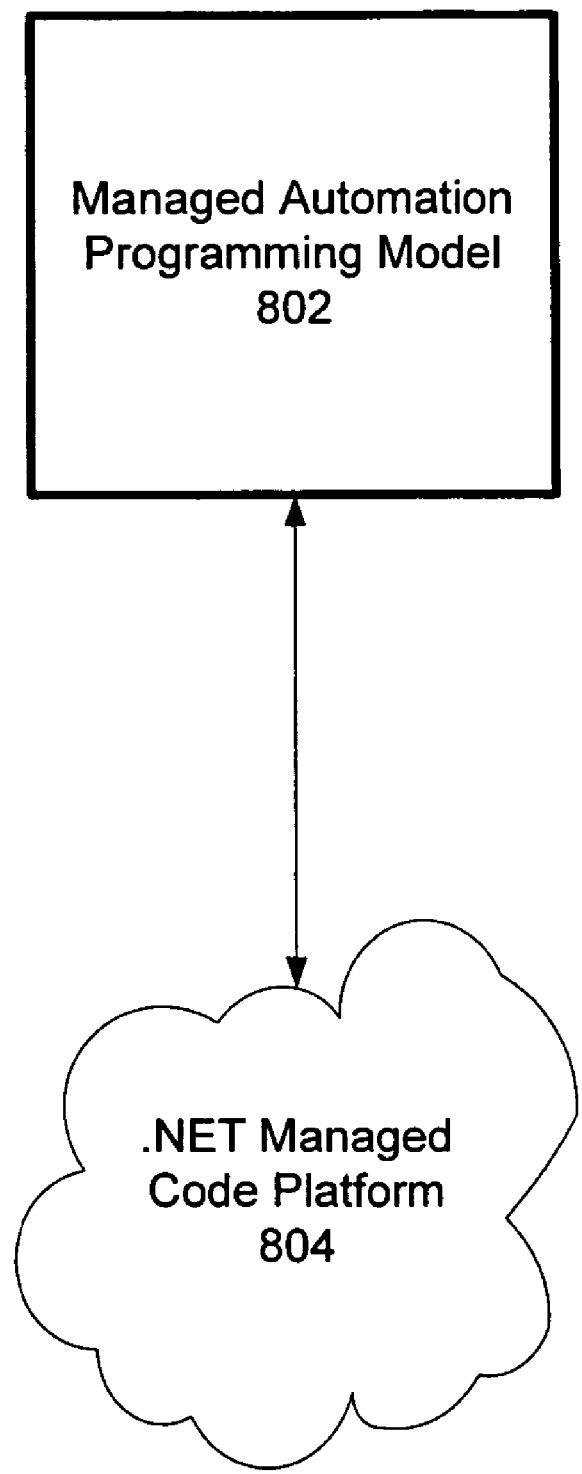
FIG. 8 illustrates a NET framework with a MAPM sitting on top of it.

In fact, as FIG. 8 illustrates, the Managed Automation Programming Model (MAPM) discussed in the previous sections above, sits on top of the .NET framework discussed in this section. Specifically, a .NET framework 804 is shown with a MAPM 802 on top of the framework 804. However, multiple MAPMs could interact with the .NET framework.

While some exemplary aspects herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for coordinating wireless traffic in accordance with the invention may be included in, supported in or accessed via all of the languages and services enabled by managed code, such as .NET code, and in other distributed computing frameworks as well.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for coordinating wireless traffic in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes. Application data, Web services, VoIP applications, music players, etc. generate a lot of data that must be transmitted back and forth potentially in a wireless manner across heterogeneous devices, and thus the techniques for coordinating wireless traffic, in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for coordinating wireless traffic in accordance with the invention.

Figure 9:
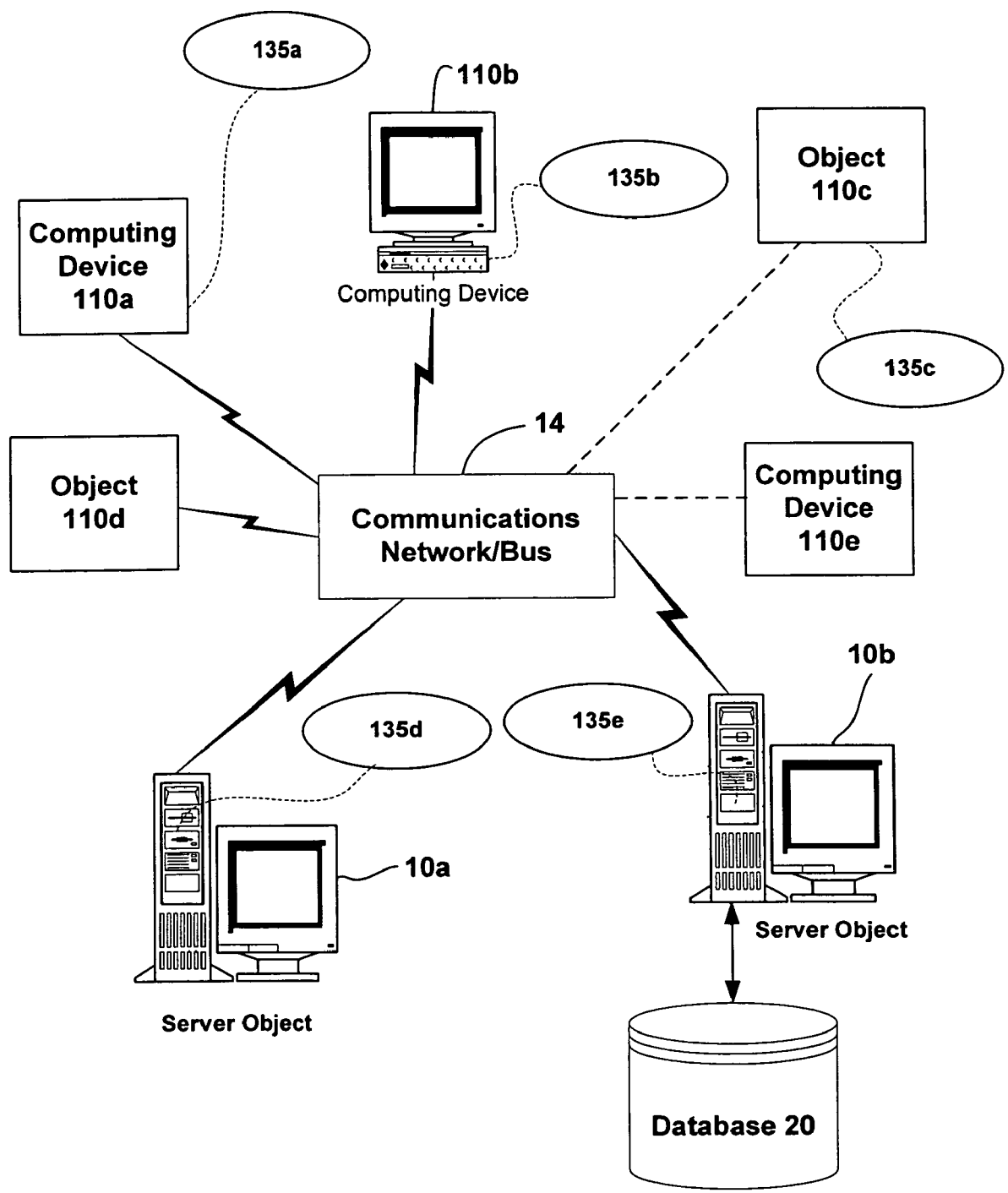
FIG. 9 provides a schematic diagram of an exemplary networked or distributed computing environment.

FIG. 9 provides a schematic diagram of an exemplary networked or distributed computing environment. The distributed computing environment comprises computing objects 10*a*, 10*b*, etc. and computing objects or devices 110*a*,

110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 9, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use with the systems and methods for coordinating wireless traffic in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to coordinating wireless traffic according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, which coordinate traffic in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 9, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate the coordination of wireless traffic in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for coordinating wireless traffic in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 9 illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to efficiently deliver wireless traffic, including VoIP data.

In a network environment in which the communications network/bus 14 is the Internet, for example, the servers 10a, 10b, etc. can be Web servers with which the clients 110a, 110*b*, 110*c*, 110*d*, 110*e*, etc. communicate via any of a number of known protocols such as HTTP. Servers 10*a*, 10*b*, etc. may also serve as clients 110*a*, 110*b*, 110*c*, 110*d*, 110*e*, etc., as may be characteristic of a distributed computing environment.

As mentioned, communications may be wired or wireless, or a combination, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 10*a*, 10*b*, etc. may be equipped with various application program modules or objects 135*a*, 135*b*, 135*c*, etc. and with connections or access to various types of storage elements or objects, across which files or data streams may be stored or to which portion(s) of files or data streams may be downloaded, transmitted or migrated. Any one or more of computers 10*a*, 10*b*, 110*a*, 110*b*, etc. may be responsible for the maintenance and updating of a database 20 or other storage element, such as a database or memory 20 for storing data processed or saved according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Exemplary Computing Device

Figure 10:
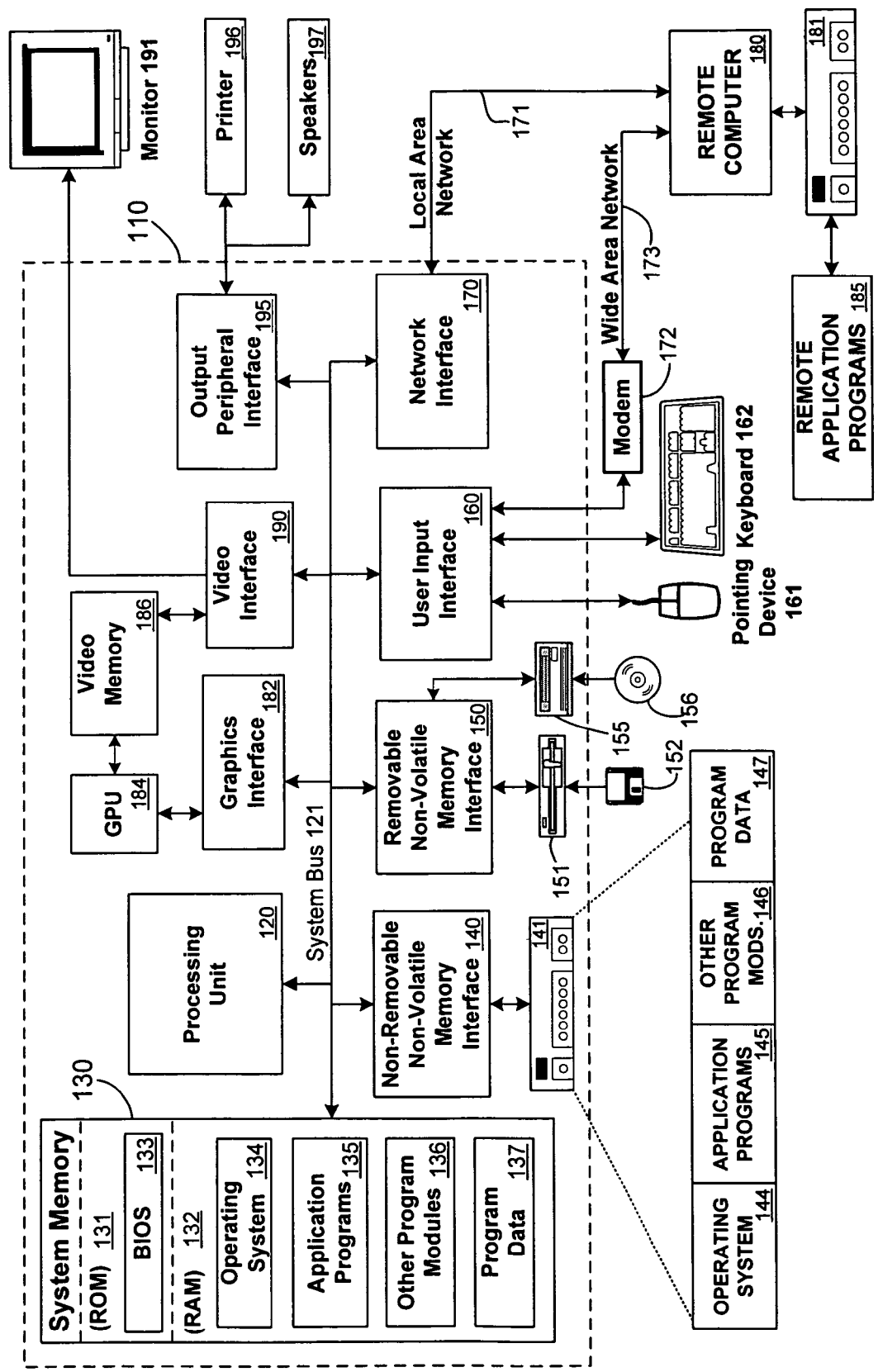
FIG. 10 provide a brief general description of a suitable computing environment in connection with which the invention may be implemented.

FIG. 10 and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that it is desirable to flexibly, or quickly process data in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques for downloading algorithmic elements to a coprocessor in accordance with the invention.

Although not required, the invention can be implemented via an operating system, for use by a developer of services for a device or object, and/or included within application software that operates in connection with the methods for coordinating wireless traffic in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes, as described above.

FIG. 10 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they may be different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more coprocessors, such as graphics processing units (GPUs) 184, may communicate with graphics interface 182. In this regard, GPUs 184 generally include on-chip memory storage, such as register storage and GPUs 184 communicate with a video memory 186, wherein the methods for downloading algorithmic elements to a coprocessor of the invention have particular impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. Data communications device 172, such as a modem, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

While the present invention has been described in connection with the preferred aspects, as illustrated in the various figures, it is understood that other similar aspects may be used or modifications and additions may be made to the described aspects for performing the same function of the present invention without deviating therefrom. For example, in one aspect of the invention a managed automation programming model was discussed that allowed for at least versioning, isolation, and late binding. However, other equivalent systems and methods to these described aspects are also contemplated by the teachings herein. Therefore, the present invention should not be limited to any single aspect, but rather construed in breadth and scope in accordance with the appended claims.

What is claimed:

1. A computer readable medium that comprises a computer storage medium, storing tangible computer readable instructions for providing automated communication, isolation, versioning, and late binding between computing entities, comprising:
   an instruction configured to initialize:
      a first component;
      a second component;

a first adapter;

a second adapter; and a contract configured to allow communications between the first and the second components, wherein the first adapter is coupled to the first component and the contract, and wherein the second adapter is coupled to the second component and the contract, wherein the contract provides a communication layer between the first component and the second component via the first adapter and the second adapter, respectively;

an instruction configured to execute a .NET managed automation framework, wherein the managed automation framework incorporates the first adapter, the second adapter, and the contact;

an instruction configured to provide isolation between the first component and the second component by making selected information invisible from the first component to the second component and vice versa, by exposing mainly protocols and selected types;

wherein said isolation is at least in part provided by a remoting boundary, wherein the remoting boundary is an equivalent of a miniprocess within a process or a separate process;

wherein furthermore the remoting boundary prevents reflection across the remote boundary and instead substitutes remote reflection via local reflection by using a group of contracts that emulate the functionality of the remote reflection;

an instruction configured to provide the interoperability of different versions of the first component with different versions of the second components via the contract that remains constant between different versions of components;

an instruction configured to provide dynamic binding between the first component and the second component at runtime across said remoting boundary by using the .NET framework to allocate memory for storage of data and instructions, granting and denying permissions to the first and second components, managing the execution of the first and second components, and reallocating memory for resources that are not needed by the first and second components.

2. The computer readable medium according to claim 1, wherein the first adapter and the second adapter are each at least one of (a) a protocol adapter and (b) a view adapter.

3. The computer readable medium according to claim 1, wherein the first component is an application associated with the managed automation model and the second component is an add-in.

4. A computer readable medium that comprises a computer storage medium, storing tangible computer readable instructions for providing automated communication and versioning resilience between computing entities, comprising:

an instruction configured to initialize a first component, a second component, a first adapter, a second adapter, and a contract configured to allow communications between the first and the second components, wherein the first adapter is coupled to the first component and the contract, and wherein the second adapter is coupled to the second component and the contract, wherein the contract provides a communication layer between the first component and the second component via the first adapter and the second adapter, respectively;

an instruction configured to execute a .NET managed automation framework, wherein the managed automation framework incorporates the first adapter, the second adapter, and the contract;

an instruction configured to provide isolation between the first component and the second component by making selected information invisible from the first component to the second component and vice versa, by exposing mainly protocols and selected types;

wherein said isolation is at lest in part provided by a remoting boundary, wherein the remoting boundary is an equivalent of a miniprocess within a process or a separate process;

wherein furthermore the remoting boundary prevents reflection across the remote boundary and instead substitutes remote reflection via local reflection by using a group of contracts that emulate the functionality of the remote reflection;

wherein the contract remains constant during the versioning between the first component and the second component;

an instruction configured to provide dynamic binding between the first component and the second component at runtime across said remoting boundary by using the .NET framework to allocate memory for storage of data and instructions, granting and denying permissions to the first and second components, managing the execution of the first and second components, and reallocating memory for resources that are not needed by the first and second components; and wherein at least one of the first adapter and the second adapter is a combination adapter.

5. The computer readable medium according to claim 4, wherein the first adapter and the second adapter are each at least one of (a) a protocol adapter and (b) a view adapter.

6. The computer readable medium according to claim 4, wherein the independent versioning between the first component and the second component allows for the first component to change versions with respect to the second component, and vice versa.

7. The computer readable medium according to claim 4, wherein the first component is an application associated with the managed automation model and the second component is an add-in.

8. A computer readable medium that comprises a computer storage medium, storing tangible computer readable instructions for providing automated communication and late-binding ability between computing entities, comprising:

an instruction configured to initialize a first component, a second component, a first adapter, a second adapter, and a contract configured to allow communications between the first and the second components, wherein the first adapter is coupled to the first component and the contract, and wherein the second adapter is coupled to the second component and the contract, wherein the contract provides a communication layer between the first component and the second component via the first adapter and the second adapter, respectively; and an instruction configured to execute a .NET managed automation framework, wherein the managed automation framework incorporates the first adapter, the second adapter, and the contract;

an instruction configured to provide isolation between the first component and the second component by making selected information invisible from the first component to the second component and vice versa, by exposing mainly protocols and selected types;

wherein said isolation is at lest in part provided by a remoting boundary, wherein the remoting boundary is an equivalent of a miniprocess within a process or a separate process;

wherein furthermore the remoting boundary prevents reflection across the remote boundary and instead substitutes remote reflection via local reflection by using a group of contracts that emulate the functionality of the remote reflection;

an instruction configured to provide the interoperability of different versions of the first component with different versions of the second components via the contract that remains constant between different versions of components;

an instruction configured to provide late-binding between the first component and the second component at runtime across said remoting boundary by using the .NET framework to allocate memory for storage of data and instructions, granting and denying permissions to the first and second components, managing the execution of the first and second components, and reallocating memory for resources that are not needed by the first and second components.

9. The computer readable medium according to claim 8, wherein the first adapter and the second adapter are each at least one of (a) a protocol adapter and (b) a view adapter.

10. The computer readable medium according to claim 8, wherein the protocol is based on a base class.

11. The computer readable medium according to claim 8, wherein the first adapter and the second adapter is based on a base class.

12. The computer readable medium according to claim 8, wherein the remoting boundary is an equivalent of a miniprocess within a process, a separate process, or a separate physical machine.

13. The computer readable medium according to claim 8, wherein the managed automation framework manages the first adapter, the second adapter, and the protocol to prevent type leakage across a remoting boundary.

* * * * *